US012006869B2

(12) United States Patent
Rambo

(10) Patent No.: US 12,006,869 B2
(45) Date of Patent: Jun. 11, 2024

(54) HEAT EXCHANGER FOR A GAS TURBINE ENGINE

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/959,534

(22) Filed: Oct. 4, 2022

(65) Prior Publication Data
US 2024/0110509 A1   Apr. 4, 2024

(51) Int. Cl.
*F02C 7/12* (2006.01)
*F02C 9/18* (2006.01)

(52) U.S. Cl.
CPC .......... *F02C 7/12* (2013.01); *F02C 9/18* (2013.01); *F05D 2260/20* (2013.01)

(58) Field of Classification Search
CPC ...... F02C 7/12; F02C 7/14; F02C 7/18; F02C 7/185; F02C 7/224
See application file for complete search history.

(56) References Cited

U.S. PATENT DOCUMENTS

| | | | |
|---|---|---|---|
| 2,715,019 A | 8/1955 | Walter | |
| 4,842,055 A * | 6/1989 | Ohtsu | F28F 9/0282 159/4.04 |
| 6,003,594 A | 12/1999 | Cameron et al. | |
| 6,066,232 A * | 5/2000 | Mohr | B01D 1/065 203/1 |
| 6,098,703 A * | 8/2000 | Yoshii | F28D 1/0333 165/174 |
| 6,253,837 B1 | 7/2001 | Seiler et al. | |
| 7,111,669 B2 * | 9/2006 | Hoglinger | F28D 1/0443 165/174 |
| 7,303,004 B2 * | 12/2007 | Iwasa | F28F 9/0263 165/176 |
| 7,503,382 B2 | 3/2009 | Maezawa et al. | |
| 8,141,790 B2 | 3/2012 | Sheppard | |
| 8,261,553 B2 * | 9/2012 | Bartosch | F02G 5/00 60/716 |
| 10,619,934 B2 * | 4/2020 | Honnorat | F28F 9/0273 |
| 11,268,773 B2 | 3/2022 | Tonellato et al. | |

(Continued)

FOREIGN PATENT DOCUMENTS

| | | | | | |
|---|---|---|---|---|---|
| CN | 1618002 A | * | 5/2005 | ........... | F28D 1/0417 |
| CN | 1662401 A | * | 8/2005 | ............. | B60K 11/00 |

(Continued)

*Primary Examiner* — Craig Kim
(74) *Attorney, Agent, or Firm* — Dority & Manning, P.A.

(57) ABSTRACT

A heat exchanger includes an inlet plenum chamber, an outlet plenum chamber fluidly coupled to the inlet plenum chamber, and a plurality of intermediate plenum chambers disposed downstream from the inlet plenum chamber and upstream from the outlet plenum chamber. The plurality of intermediate plenum chambers includes a first intermediate plenum chamber, at least one tube bundle, and a first bypass valve fluidly coupled to the first intermediate plenum chamber. The first bypass valve is configured to control fluid flow rate from the first intermediate plenum chamber to the outlet plenum chamber.

26 Claims, 13 Drawing Sheets

(56) References Cited

U.S. PATENT DOCUMENTS

| | | | |
|---|---|---|---|
| 11,287,197 | B2 | 3/2022 | Tonellato |
| 2004/0256091 | A1* | 12/2004 | Higashiyama ........ F28D 1/0333 |
| | | | 165/174 |
| 2005/0006067 | A1* | 1/2005 | Hoglinger ............ F28D 1/0417 |
| | | | 165/140 |
| 2009/0056909 | A1 | 3/2009 | Braun |
| 2009/0236088 | A1 | 9/2009 | Davis et al. |
| 2015/0252727 | A1* | 9/2015 | Aoki ...................... B64D 37/34 |
| | | | 165/51 |
| 2016/0201563 | A1* | 7/2016 | Stearns .................. F02C 7/224 |
| | | | 60/776 |
| 2017/0334736 | A1* | 11/2017 | Lam ........................ B01D 1/14 |
| 2019/0072006 | A1* | 3/2019 | Duffy .................... F01K 23/101 |

FOREIGN PATENT DOCUMENTS

| | | | | |
|---|---|---|---|---|
| EP | 1775440 A1 | * | 4/2007 | ............... B60H 1/14 |
| EP | 3156592 A1 | * | 4/2017 | ............ F01D 11/001 |
| FR | 3125317 A1 | * | 1/2023 | .............. F02C 7/228 |
| JP | 2015114043 A | * | 6/2015 | |
| JP | 2016061544 A | * | 4/2016 | |
| WO | WO-03046457 A1 | * | 6/2003 | ........... F28D 1/0417 |
| WO | WO-2014137417 A1 | * | 9/2014 | ................ F02C 7/05 |
| WO | WO-2015080778 A2 | * | 6/2015 | ................ F02C 7/14 |

\* cited by examiner

HEAT EXCHANGER FOR A GAS TURBINE ENGINE

FIELD

The present disclosure relates to a heat exchanger for a gas turbine engine and a gas turbine engine including the same.

BACKGROUND

A propulsion system for commercial aircraft typically includes one or more aircraft engines, such as turbofan jet engines. Heat exchangers are utilized to transfer waste heat from the turbofan jet engine to various fluids such as jet fuel, hydrogen gas and lubricating oil.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
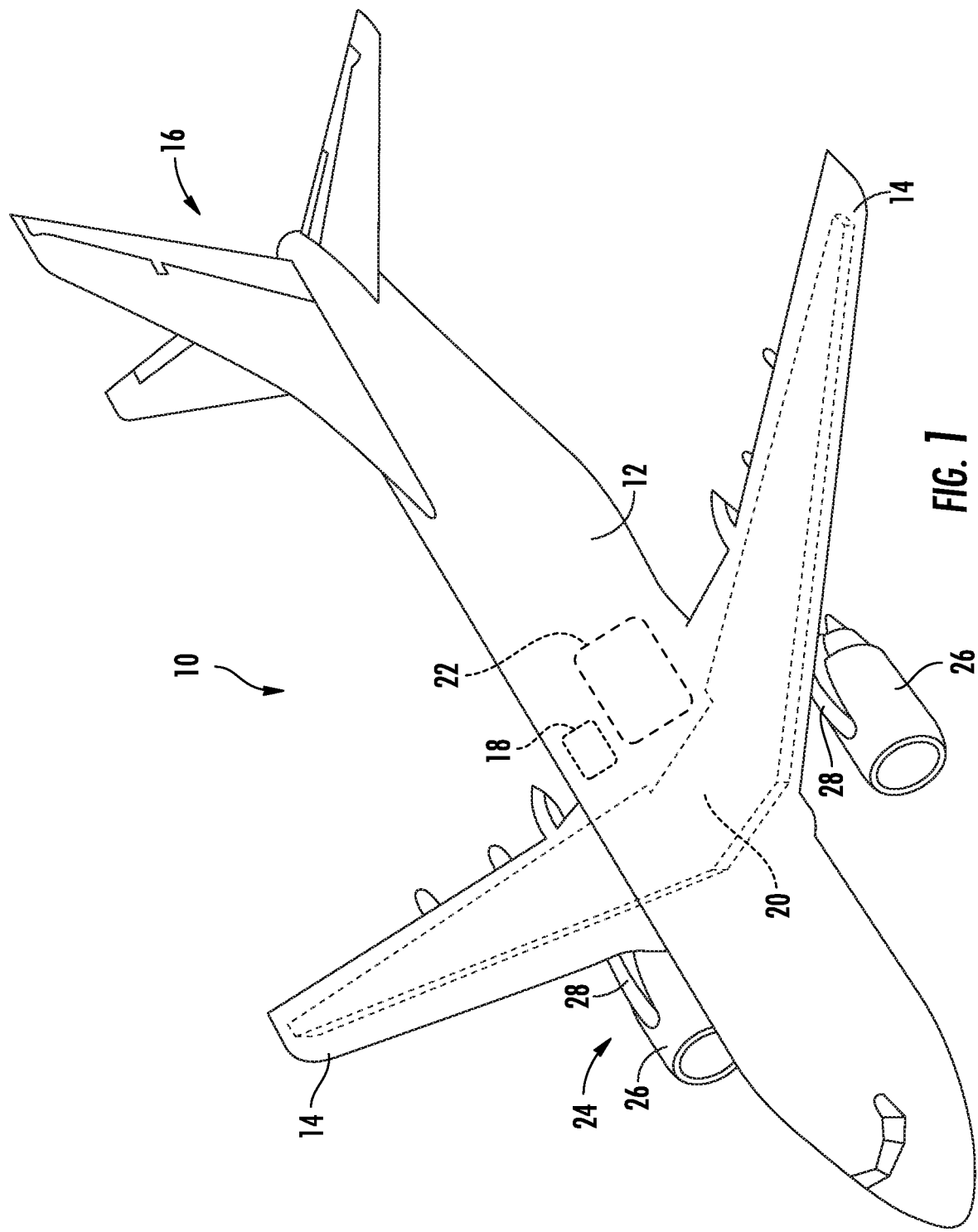
FIG. 1 is a schematic view of an aircraft having a fuel system in accordance with an exemplary embodiment of the present disclosure.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The present disclosure is generally related to a heat exchanger. Heat exchangers may provide a combination of pressure or temperature bypass, resulting in either fully flowing or fully bypassing the heat exchanger. This results in an either all or nothing heat transfer between a hot-side fluid and a cold-side fluid. The present disclosure provides a multi-pass heat exchanger with either an active or passive bypass valve that is fluidly coupled to a primary tube outlet and a secondary or intermediate tube outlet. The bypass valves modulates a heat transfer rate between a first fluid and a secondary fluid flowing through the heat exchanger based at least in part on engine operating conditions, thus providing for finer temperature control required on hot fuel architectures and hydrogen-fuel propulsion systems where off heat exchanger on/off bypass systems do not provide sufficient discharge temperature across an full range of engine operating conditions. In addition, modulating the heat transfer rate reduces thermal strain and transient thermal shock. The heat exchanger described herein may also be implemented for fuel-cooled oil cooler and air-cooled oil cooler applications.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a fuel delivery system 18 which includes one or more fuel storage tanks 20. In certain embodiments, the fuel storage tanks 20 may be disposed within the fuselage 12 and/or the wings 14 and are configured to store standard aviation jet fuel. In certain embodiments, the fuel delivery system 18 may further include or may only include a liquid hydrogen fuel tank 22 for holding a hydrogen fuel in a liquid phase.

The liquid hydrogen fuel tank 22 may be located at other suitable locations in the fuselage 12 or the wing 14. It will be appreciated that the liquid hydrogen fuel is stored in the liquid hydrogen fuel tank 22 at a relatively low temperature. For example, the hydrogen fuel may be stored in the liquid hydrogen fuel tank 22 at about −253 Deg. Celsius or less at an atmospheric pressure, or at other temperatures and pressures to maintain the hydrogen fuel in or transitioning into the liquid phase.

As shown in FIG. 1, the aircraft 10 further includes a propulsion system 24 that produces a propulsive thrust required to propel the aircraft 10 in flight, during taxiing operations, etc. Although the propulsion system 24 is shown attached to the wing(s) 14, in other embodiments it may additionally or alternatively include one or more aspects coupled to other parts of the aircraft 10, such as, for example, the empennage 16, the fuselage 12, or both. The propulsion system 24 includes at least one engine. In the exemplary embodiment shown, the aircraft 10 includes a pair of engines with each engine being configured as a gas turbine engine 26. Each gas turbine engine 26 is mounted to the aircraft 10 in an under-wing configuration through a respective pylon 28. Each gas turbine engine 26 is capable of selectively generating a propulsive thrust for the aircraft 10.

Figure 2:
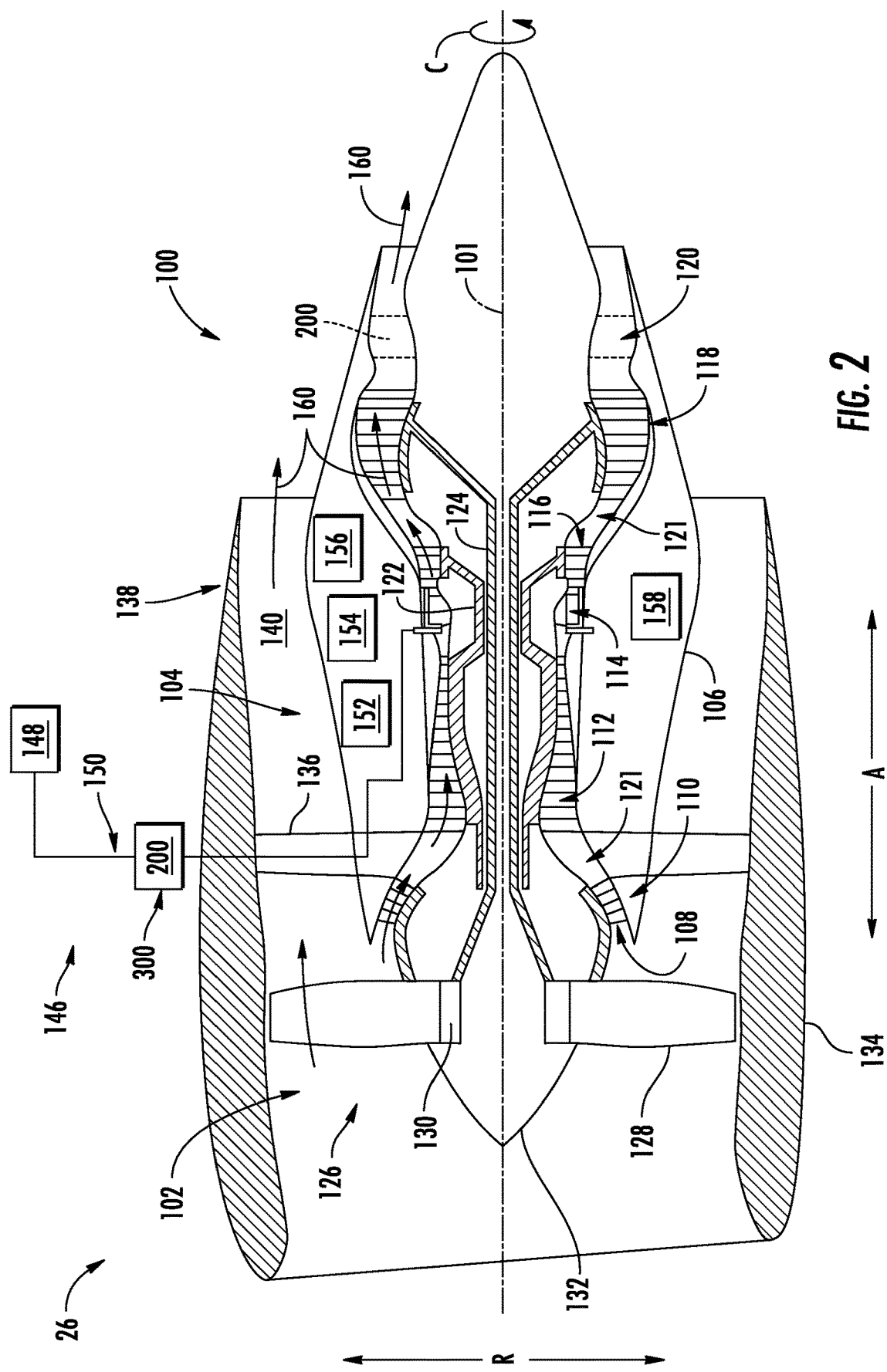
FIG. 2 is a schematic, cross-sectional view of a gas turbine engine in accordance with an exemplary embodiment of the present disclosure.

FIG. 2 is a schematic, cross-sectional view of an exemplary turbine engine 26 in accordance with an embodiment of the present disclosure. As shown in FIG. 2, the turbine engine 26 is configured as a high bypass turbofan engine, herein referred to as engine 100 or gas turbine engine 100. The engine 100 defines an axial direction A (extending parallel to a longitudinal centerline 101 provided for reference), a radial direction R, and a circumferential direction C extending about the longitudinal centerline 101. In general, the engine 100 includes a fan section 102 and a turbomachine 104 disposed downstream from the fan section 102.

The turbomachine 104 depicted generally includes an outer casing 106 that defines an annular inlet 108. The outer casing 106 encases, in serial flow relationship, a compressor section including a booster or low-pressure compressor 110, a high-pressure compressor 112, a combustion section 114, a turbine section including a high-pressure turbine 116 and a low-pressure turbine 118, and a jet exhaust section 120. The compressor section, combustion section 114, and turbine section together define at least in part a core air flow-path 121 extending from the annular inlet 108 to the jet exhaust section 120.

The engine 100 further includes a high-pressure shaft 122 drivingly connecting the high-pressure turbine 116 to the high-pressure compressor 112, and a low-pressure shaft 124 drivingly connecting the low-pressure turbine 118 to the low-pressure compressor 110. The low-pressure compressor 110, the low-pressure turbine 118, and the low-pressure shaft 124 at least partially makeup a low-pressure spool of the turbomachine 104. The high-pressure compressor 112, the high-pressure turbine 116, and the high-pressure shaft 122 at least partially make up a high-pressure spool of the turbomachine 104.

The fan section 102 includes a fan 126 having a plurality of fan blades 128 coupled to a disk 130. The fan blades 128 and disk 130 are together rotatable about the longitudinal centerline 101 by the low-pressure shaft 124. The disk 130 is covered by a rotatable front hub 132 aerodynamically contoured to promote an airflow through the plurality of fan blades 128. Further, an annular fan casing or nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 to define a bypass airflow passage 140 therebetween.

Referring still to FIG. 2, the engine 100 is operable with a fuel system 146 for receiving a flow of fuel such as jet fuel or gaseous hydrogen fuel (GH2) from the fuel system 146. The fuel system 146 may be configured similarly to the fuel delivery system 20 of FIG. 1. Accordingly, the fuel system 146 generally includes a fuel tank 148, and a fuel delivery assembly 150. The fuel delivery assembly 150 provides a fuel flow from the fuel tank 148 to the engine 100, and more specifically to a fuel manifold (not labeled) of the combustion section 114 of the turbomachine 104.

Moreover, as is depicted schematically, the engine 100 further includes various accessory systems to aid in the operation of the engine 100. For example, the engine 100 includes a main lubrication system 152 configured to provide a lubricant to various bearings and gear meshes in the compressor section, the turbine section, the high-pressure shaft 122, the low-pressure shaft 124, etc. The lubricant provided by the main lubrication system 152 may increase the useful life of such components and may remove a certain amount of heat from such components.

Additionally, the engine 100 includes a compressed cooling air (CCA) system 154 for providing air from one or both of the high-pressure compressor 112 or low-pressure compressor 110 to one or both of the high-pressure turbine 116 or low-pressure turbine 118. Moreover, the engine 100 includes an Active Clearance Control (ACC) system 156 for cooling a casing of the turbine section to maintain a clearance between the various turbine rotor blades and the turbine casing within a desired range throughout various engine operating conditions.

Furthermore, the engine 100 includes a generator lubrication system 158 for providing lubrication to an electronic generator (not shown), as well as cooling/heat removal for the electronic generator. The electronic generator may provide electrical power to various systems including a startup electric motor for the engine 100 and/or various other electronic components of the engine 100 and/or the aircraft 10. Heat from these accessory systems 152, 154, 156, 158, and other accessory systems may be provided as a hot-side fluid to various heat sinks/heat exchangers (as discussed below) during operation.

It will be appreciated that the engine 100 depicted in FIG. 2 is provided by way of example only. In other exemplary embodiments, any other suitable engine may be utilized with aspects of the present disclosure. For example, in other embodiments, the engine 100 may be any other suitable gas turbine engine, such as a turboshaft engine, turboprop engine, turbojet engine, etc. It will further be appreciated that in other embodiments the gas turbine engine 26 (FIG. 1) may have any other suitable configuration, such as any other suitable number or arrangement of shafts, compressors, turbines, fans, etc.

Further, although the exemplary gas turbine engine depicted in FIG. 2 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan 126, such as the low-pressure shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the engine 100 may include or be operably connected to any other suitable accessory systems. Additionally, or alternatively, the engine 100 may not include or be operably connected to one or more of the accessory systems 152, 154, 156, 158 discussed above.

Figure 3:
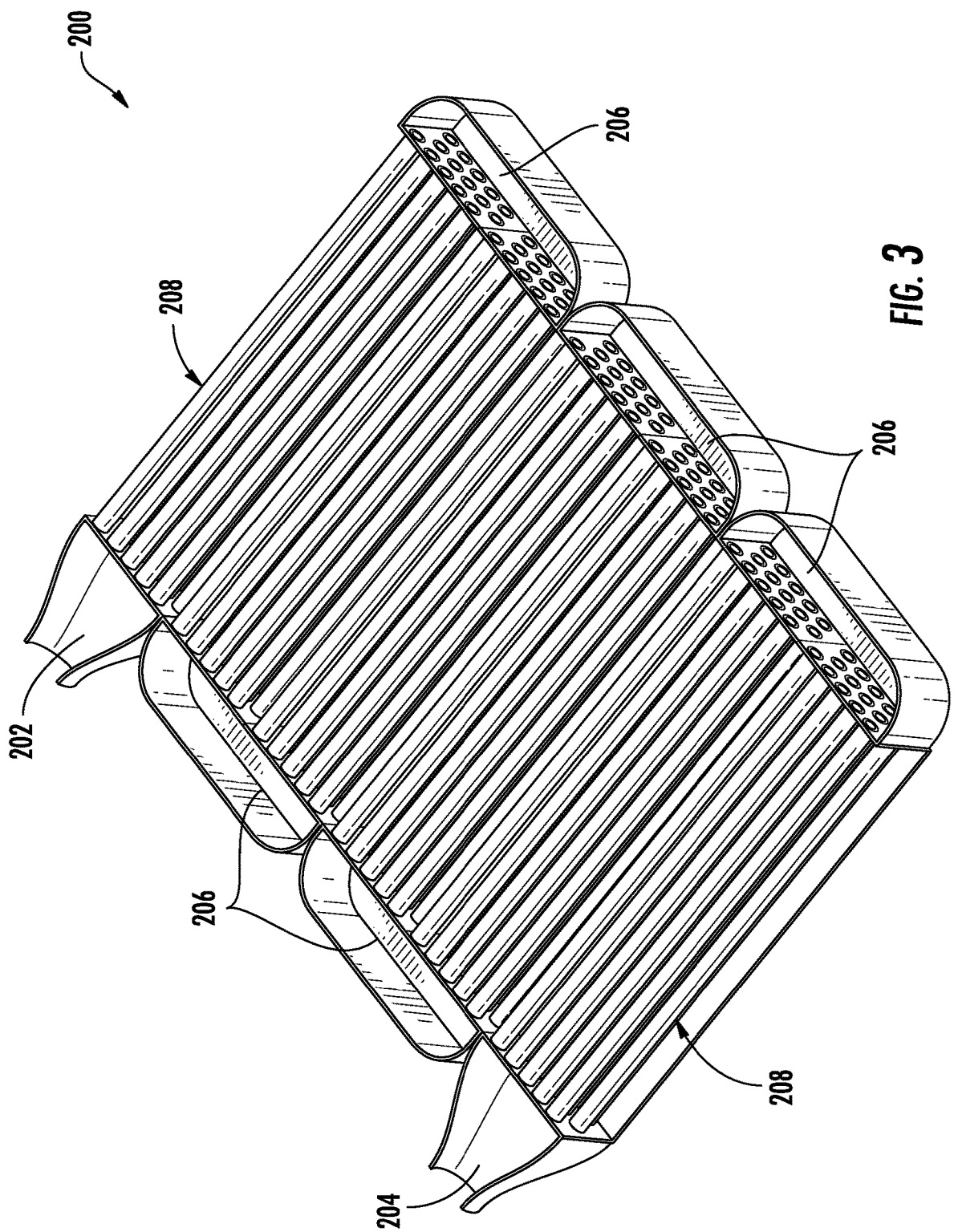
FIG. 3 is a cross-sectioned view of an exemplary heat exchanger according to exemplary embodiments of the present disclosure.
Figure 4:
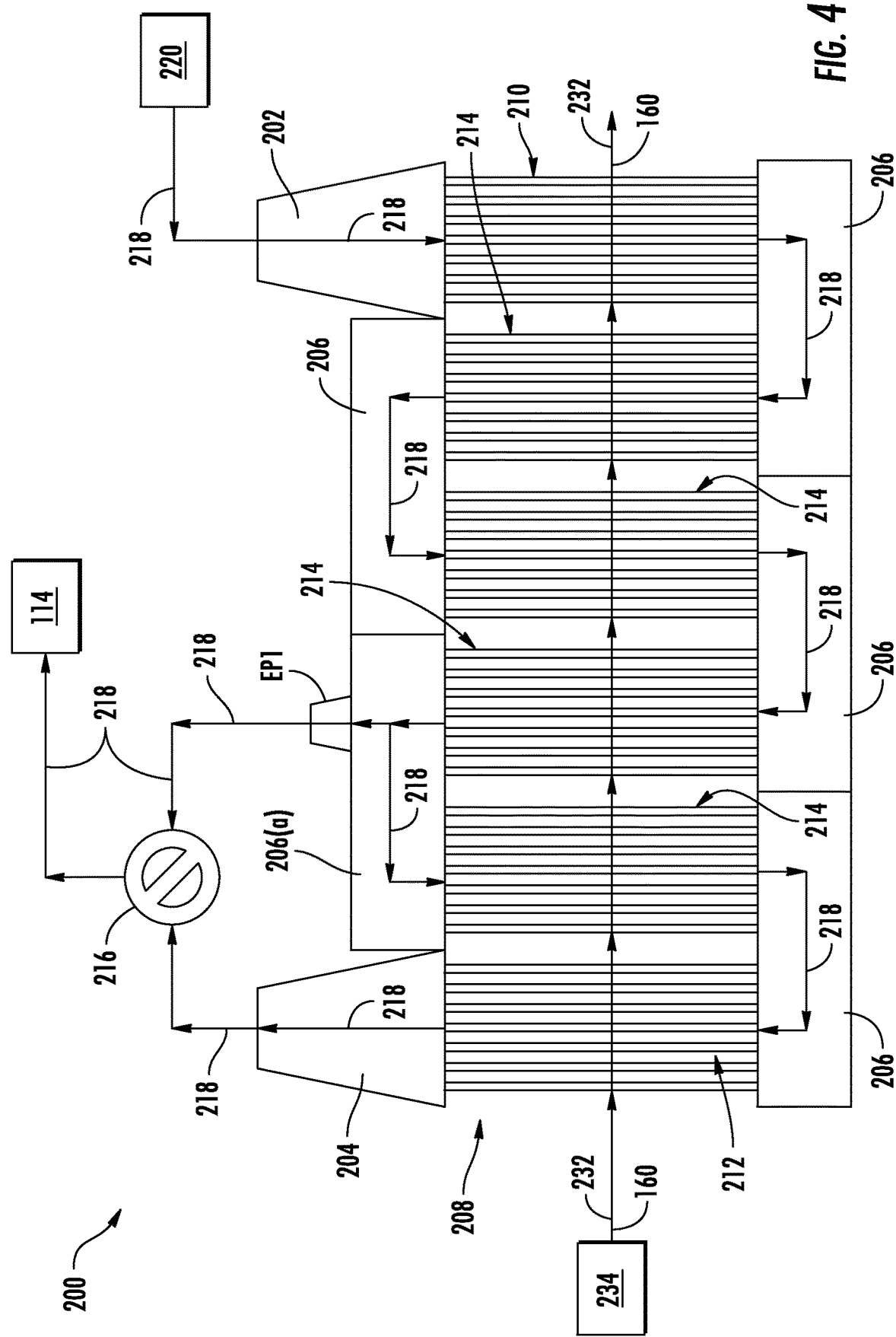
FIG. 4 is a schematic view of the exemplary heat exchanger shown in FIG. 3, according to exemplary embodiments of the present disclosure.
Figure 5:
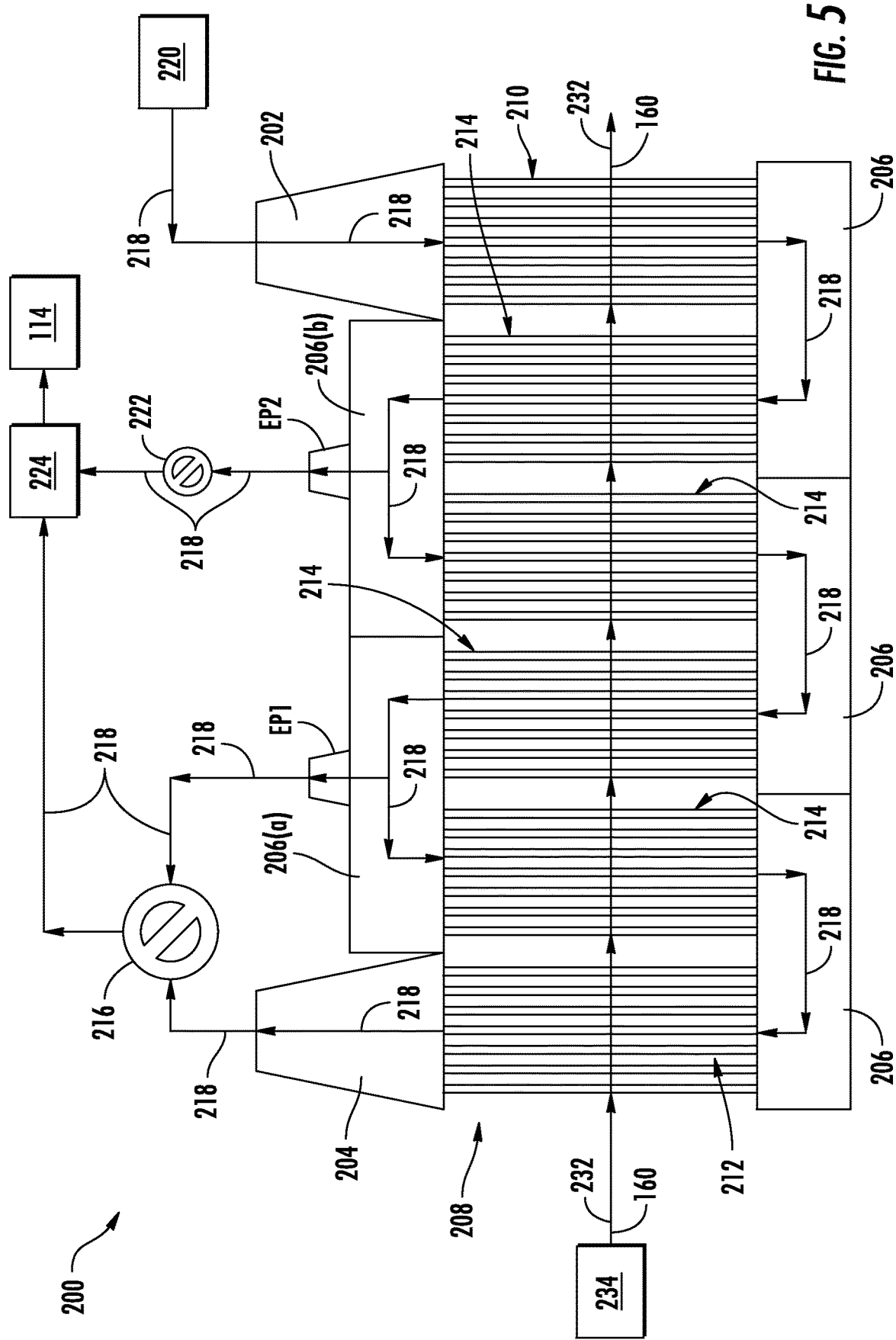
FIG. 5 is a schematic view of the exemplary heat exchanger shown in FIG. 3, according to exemplary embodiments of the present disclosure.

FIG. 3 is a cross-sectioned view of an exemplary heat exchanger 200 as may be incorporated into the aircraft 10 shown in FIG. 1 and/or the gas turbine engine 100 shown in FIG. 2, according to embodiments of the present disclosure. FIG. 4 is a schematic view of the exemplary heat exchanger 200 according to embodiments of the present disclosure. FIG. 5 is a schematic view of the exemplary heat exchanger 200 according to embodiments of the present disclosure.

As shown in FIG. 3, the heat exchanger 200 includes an inlet plenum chamber 202, an outlet plenum chamber 204, a plurality of intermediate plenum chambers 206 disposed downstream from the inlet plenum chamber 202 and upstream from the outlet plenum chamber 204, and at least one tube bundle 208. In exemplary embodiments, the at least one tube bundle 208 includes a plurality of tube bundles 208. Each individual tube bundle 208 of the plurality of tube bundles 208 fluidly couples two of the plenum chambers 202, 204, and 206. It should be appreciated that although the heat exchanger shown in FIGS. 3, 4 and 5 includes 5 intermediate plenum chambers 206, the heat exchanger 200 may include more than 5 or less than 5 intermediate plenum chambers 206 as required for a particular use or application. In exemplary embodiments as shown in FIGS. 3, 4, and 5, the plurality of tube bundles 208 are exposed between the various plenum chambers 202, 204, and 206.

In exemplary embodiments, as shown in FIGS. 4 and 5, the plurality of intermediate plenum chambers 206 includes a first intermediate plenum chamber 206(*a*). The plurality of tube bundles 208 includes an inlet tube bundle 210, an outlet tube bundle 212, and $N_+$ or a plurality of intermediate tube bundles 214. The $N_+$ intermediate tube bundles 214 provide for fluid communication from the inlet plenum chamber 202, to each respective intermediate plenum chamber 206 of the plurality of intermediate plenum chambers 206, and to the outlet tube bundle 212 which is fluidly coupled to the outlet plenum chamber 204.

In exemplary embodiments, as shown in FIGS. 4 and 5, the heat exchanger 200 includes a first bypass valve 216 fluidly coupled to the first intermediate plenum chamber 206(*a*) via a first extraction port or outlet (EP1) of the first intermediate plenum chamber 206(*a*). The first bypass valve 216 is configured to control fluid flow rate between the first intermediate plenum chamber 206(*a*) and the outlet plenum chamber 204 of a first fluid 218 from a first fluid source 220.

In exemplary embodiments, as shown in FIGS. 4 and 5, the first bypass valve 216 is disposed outside of the first intermediate plenum chamber 206(*a*). In particular embodiments, the first bypass valve 216 is an actively controlled splitter valve. In certain embodiments, the first bypass valve 216 may be pneumatically or electrically actuated. In particular embodiments, the outlet plenum chamber 204 is fluidly coupled to the first bypass valve 216. In exemplary embodiments, the first bypass valve 216 is fluidly coupled to the combustion section 114 as shown in FIG. 2 or other component or section of the gas turbine engine 100 shown in FIG. 2.

In particular embodiments, as shown in FIG. 5, the heat exchanger 200 may further include a second bypass valve 222 fluidly coupled to a second intermediate plenum chamber 206(*b*) of the plurality of intermediate plenum chambers 206 via a second extraction port or outlet (EP2). In exemplary embodiments, the second intermediate plenum chamber 206(*b*) is disposed upstream from the first intermediate plenum chamber 206(*a*) and downstream from the inlet tube bundle 210. In particular embodiments, the first bypass valve 216 and the second bypass valve 222 are fluidly coupled to a mixing chamber 224 thus allowing for mixing of a first portion of the first fluid 218 flowing from the first intermediate plenum chamber 206(*a*) and a second portion of the first fluid 218 flowing from the second intermediate plenum chamber 206(*b*) upstream from the combustion section 114 or other component or section of the gas turbine engine 100 shown in FIG. 2.

The second bypass valve 222 is configured to control fluid flow rate of the first fluid 218 from the first fluid source 220 to the first intermediate plenum chamber 206(*a*). In an exemplary embodiment as shown in FIG. 4, the second bypass valve 222 is disposed outside of the second intermediate plenum chamber 206(*b*).

In particular embodiments, the second bypass valve 222 is an actively controlled splitter valve. The actively controlled splitter valve may be actuated/controlled via a controller which signals the splitter valve to open or close depending on certain operating variables of the engine 100. In particular embodiments, the second bypass valve 222 is a pressure relief valve. As used herein, a pressure relief valve refers to any valve (active or passive) which is configured to prevent over pressurization of the heat exchanger at certain predetermined pressures or temperatures. In certain embodiments, the second bypass valve 222 may be pneumatically or electrically actuated. In exemplary embodiments, the second bypass valve 222 is fluidly coupled to the combustion section 114 or other component or section of the gas turbine engine 100 shown in FIG. 2.

Figure 6:
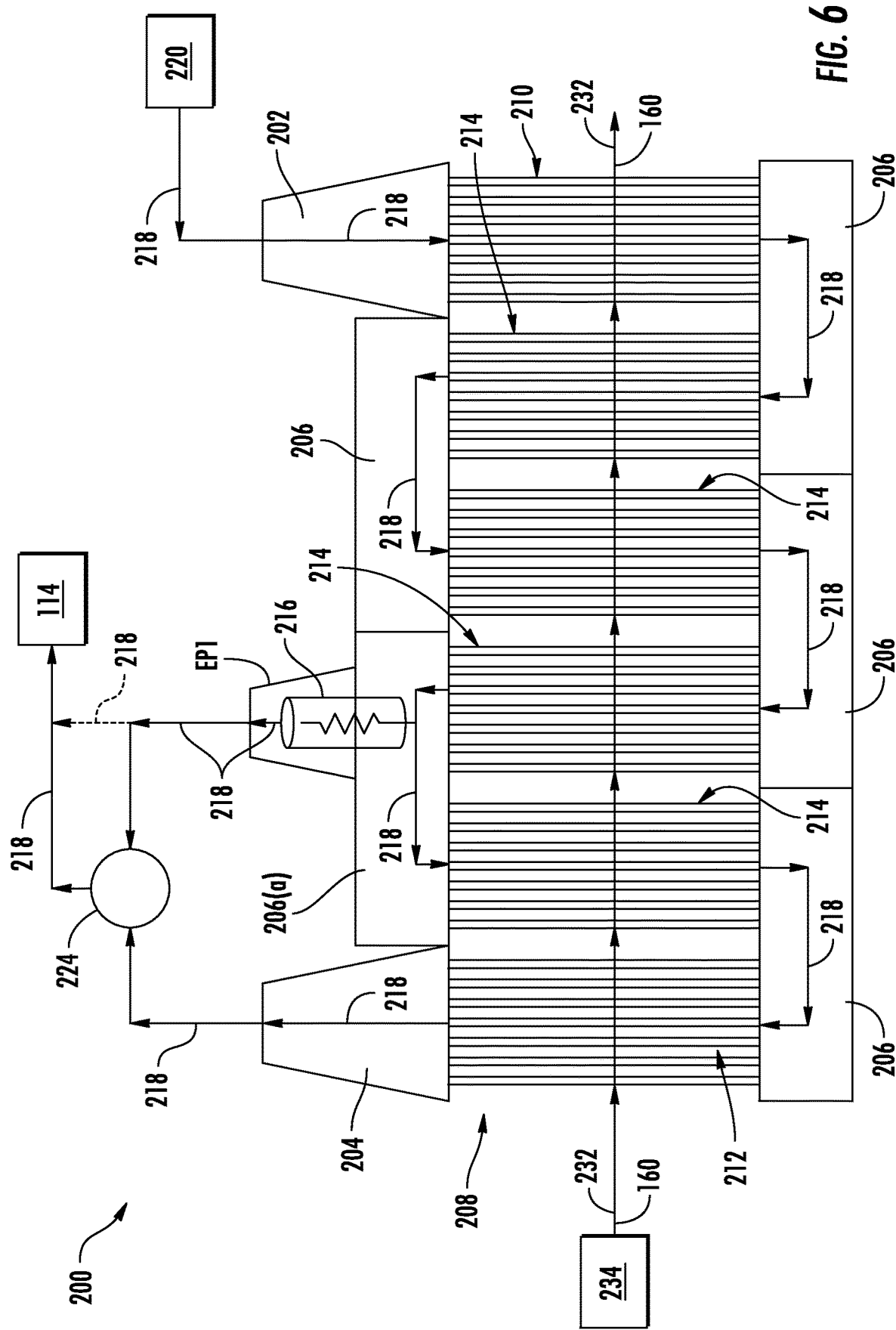
FIG. 6 is a schematic view of the exemplary heat exchanger shown in FIG. 3, according to exemplary embodiments of the present disclosure.
Figure 7:
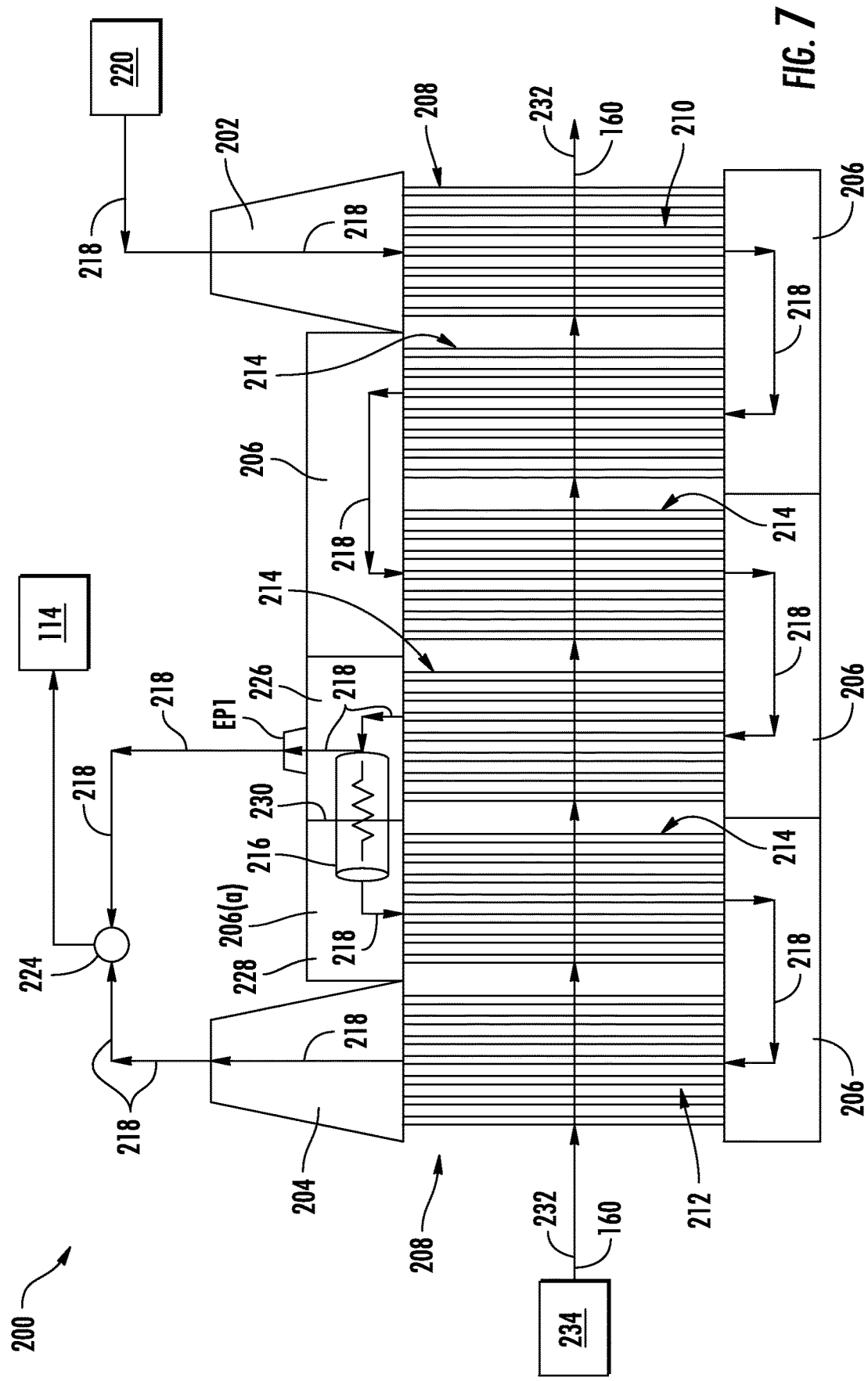
FIG. 7 is a schematic view of the exemplary heat exchanger shown in FIG. 3, according to exemplary embodiments of the present disclosure.

FIG. 6 is a schematic view of the exemplary heat exchanger 200 shown in FIG. 3, according to embodiments of the present disclosure. FIG. 7 is a schematic view of the exemplary heat exchanger 200 according to embodiments of the present disclosure.

In particular embodiments, as shown in FIGS. 6 and 7, the first bypass valve 216 is disposed or positioned at least partially or entirely within the first intermediate plenum chamber 206(a). In various embodiments, the first bypass valve 216 may be a thermostatic valve (e.g. wax based), pressure relief valve (e.g. spring poppet valve) or a pressure relief valve that uses a shape memory alloy for an actuator and that changes position with temperature. The thermostatic valve may include a thermostatic element which transforms heat energy into mechanical energy using the thermal expansion of waxes when they melt.

In exemplary embodiments, as shown in FIG. 6, the first bypass valve 216 is configured to control fluid flow rate of the first fluid 218 from the first fluid source 220 between the first intermediate plenum chamber 206(a) and the outlet plenum chamber 204. In exemplary embodiments, the first bypass valve 216 is configured to control fluid flow rate of the first fluid 218 out of the first intermediate plenum chamber 206(a) via the first extraction port EP1 to the combustion section 114 or other component or section of the gas turbine engine 100 shown in FIG. 2. In certain embodiments, as shown in FIG. 5, the first bypass valve 216 and the outlet plenum chamber 204 are fluidly coupled to the mixing chamber 224 thus allowing for mixing of a first portion of the first fluid 218 flowing from the first intermediate plenum chamber 206(a) with a second portion of the first fluid 218 flowing from the outlet plenum chamber 204 upstream from the combustion section 114 or other component or section of the gas turbine engine 100 shown in FIG. 2.

In particular embodiments, as shown in FIG. 7, the first intermediate plenum chamber 206(a) is sub-divided into a first chamber 226 and a second chamber 228 via a wall or support structure 230. The first bypass valve 216 is mounted or otherwise arranged to fluidly couple the first chamber 226 and the second chamber 228 and is configured to meter flow of the first fluid 218 from the first chamber 226 to the second chamber 228. The first chamber 226 may be fluidly coupled to mixing chamber 224 and/or to the combustion section 114 or other component or section of the gas turbine engine 100 shown in FIG. 2 via the first extraction port EP1. In particular embodiments the first chamber 226 and the outlet plenum chamber 204 may be fluidly coupled to mixing chamber 224.

Figure 8:
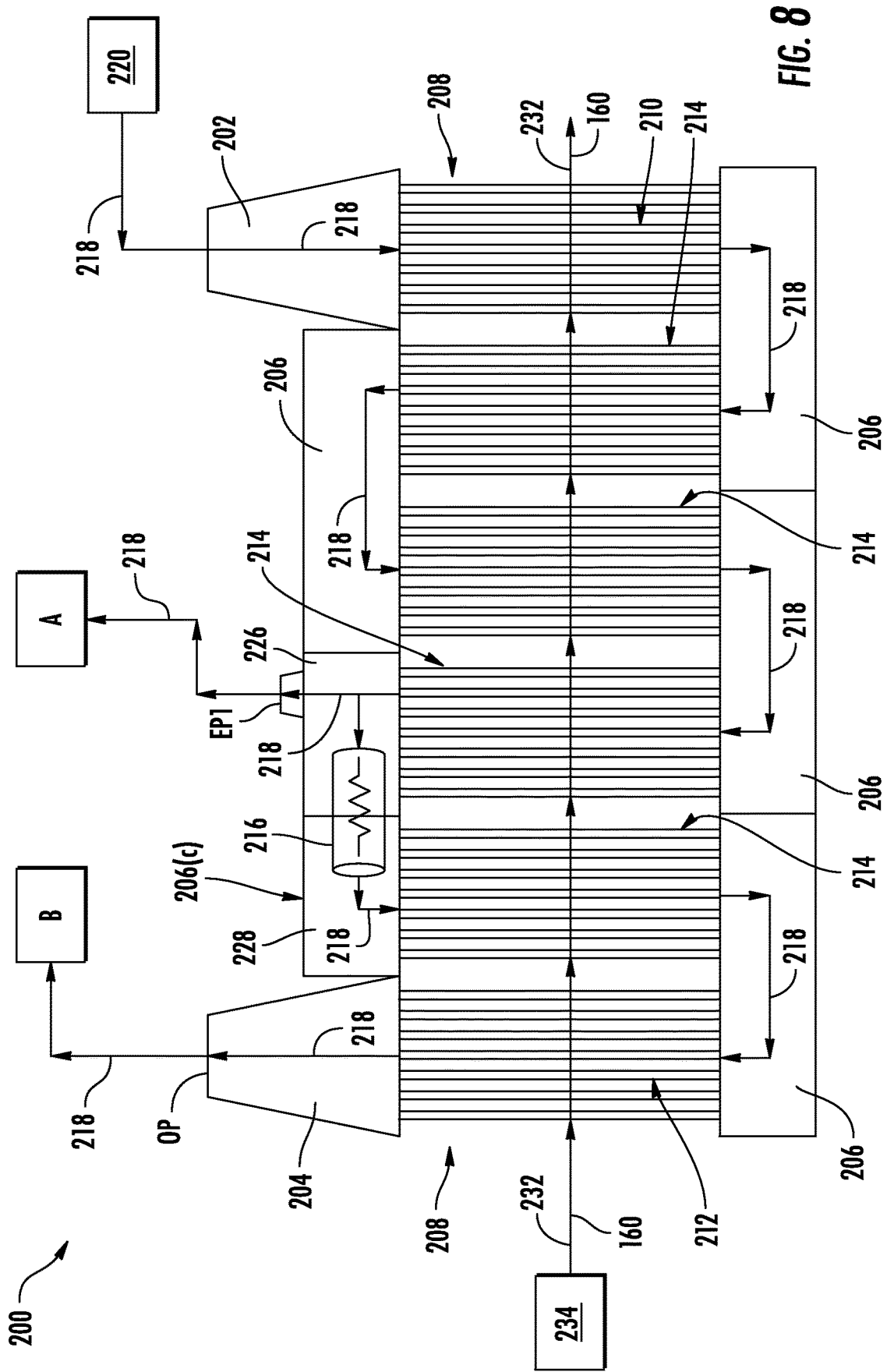
FIG. 8 is a schematic view of the exemplary heat exchanger shown in FIG. 3, according to exemplary embodiments of the present disclosure.

FIG. 8 is a schematic view of the exemplary heat exchanger 200 shown in FIG. 7, according to embodiments of the present disclosure. As shown in FIG. 8, the first bypass valve 216 is mounted or otherwise arranged to fluidly couple the first chamber 226 and the second chamber 228 and is configured to meter flow of the first fluid 218 from the first chamber 226 to the second chamber 228 by passively opening or closing, fully or partially in response to pressure or temperature of the fluid flowing between the first chamber 226 and the second chamber 228. The first chamber 226 may be fluidly coupled to a first system or section A of the gas turbine engine 100 via extraction port EP1 such as the main lubrication system 152, and/or the generator lubrication system 158 or other component or section of the gas turbine engine 100 shown in FIG. 2. In exemplary embodiments, the outlet plenum chamber 204 is fluidly coupled to a second system or section B of the gas turbine engine 100 via outlet extraction port OP.

In operation, as shown in FIGS. 4, 5, 6, 7, and 8 collectively, a second fluid 232 such as a hot-side fluid 160 (FIG. 2) flows from a second fluid source 234 and across the plurality of tube bundles 208. The second fluid 232 flows, in serial flow order, across the outlet tube bundle 212, the plurality of intermediate tube bundles 214, and across the inlet tube bundle 210. In various embodiments, the second fluid source 234 may include one or more of the following shown in FIG. 2, the low-pressure compressor 110, the high-pressure compressor 112, the high-pressure turbine 116, the low-pressure turbine 118, and the jet exhaust section 120, for extracting waste heat from a respective airflow or fluid flow therefrom, such that the extracted waste heat may be utilized as the hot-side fluid 160 (or a cold-side fluid (CSF)) in the heat exchanger 200.

In particular embodiments, the first fluid 218 includes liquid hydrogen (LH2) from the fuel tank 148 of the fuel delivery assembly 150 as shown in FIG. 2, and the second fluid 232 is used to add heat to the liquid hydrogen (LH2) flowing through the plurality of tube bundles 208, thereby transitioning or assisting the transition of the liquid hydrogen LH2 to a gaseous hydrogen (GH2) for combustion in the combustion section 114. In other embodiments, the inlet plenum chamber 202 may be fluidly coupled to the fuel system 146, the main lubrication system 152, and/or the generator lubrication system 158.

Referring to FIGS. 4 and 5, as the first fluid 218 travels through the inlet plenum chamber 202 and the plurality of intermediate plenum chambers 206, the first bypass valve 216 is actuated or adjusted to control or meter the flow rate of the first fluid 218 flowing from the first intermediate plenum chamber 206(a) to the outlet plenum chamber 204 in response to temperature changes of the second fluid 232 which are the result of changes to operational conditions of the gas turbine engine 100 (FIG. 2).

Referring now to FIG. 5, in particular embodiments wherein the heat exchanger 200 includes the second bypass valve 222, the second bypass valve 222 may be actuated or adjusted via a controller in response to signals provided by one or more sensors to control or meter the flow rate of the first fluid 218 flowing from the second intermediate plenum chamber 206(b) to the first intermediate plenum chamber 206(a) in response to the temperature changes of the second fluid 232 which are the result of changes to operational conditions of the gas turbine engine 100 (FIG. 2).

In particular embodiments, referring to FIG. 6, as the first fluid 218 travels through the inlet plenum chamber 202 and the plurality of intermediate plenum chambers 206, the first bypass valve 216 will passively transition between a fully open and fully closed position based on temperature and/or pressure of the first fluid 218 to meter the flow rate of the first fluid 218 flowing from the first intermediate plenum chamber 206(a) to the outlet plenum chamber 204. The change in temperature and/or pressure in the first fluid is in response to temperature change of the second fluid 232 which is the result of changes to operational conditions of the gas turbine engine 100 (FIG. 2) such as during, taxiing, cruise, take-off, or a sudden climb.

In particular embodiments, referring to FIG. 7 wherein the first intermediate plenum chamber 206(a) is sub-divided in the first chamber 226 and the second chamber 228, the bypass valve 216 meters flow from the first chamber 226 to the second chamber 228 by passively transitioning between an open position and a closed position in response to temperature changes of the first fluid 218 which is caused by temperature changes of the second fluid 232 which are the result of changes to operational conditions of the gas turbine engine 100 (FIG. 2).

In particular embodiments, referring to FIG. 8 wherein the first intermediate plenum chamber 206(a) is sub-divided in the first chamber 226 and the second chamber 228, the bypass valve 216 meters flow from the first chamber 226 to the second chamber 228 in response to temperature changes of the first fluid 218 which is caused by temperature changes of the second fluid 232 which are the result of changes to operational conditions of the gas turbine engine 100 (FIG. 2). In this embodiment, the first bypass valve 216 will passively transition between a fully closed position whereby the full volume of the first fluid 218 entering the inlet plenum chamber 202 is directed out of EP1 and to the first system A, to a partially or fully open position whereby some or all of the first fluid 218 flows to the outlet plenum chamber 204 and is routed to system B. This is particularly beneficial where the fluid temperature requirement for system A is different (higher or lower) than the fluid temperature requirements for system B.

As one example of a change in the temperature of the second fluid 232, during take-off, the temperature of the second fluid 232 may be much higher than required to sufficiently heat the first fluid 218 to a desired temperature. As such, the first bypass valve 216 will actuate or adjust via a passive response which is the result of a change in temperature or pressure, thereby increasing the flow rate of the first fluid 218 being extracted from the first intermediate plenum chamber 206(a) via the first exhaust port EP1, which will reduce or may eliminate the flow of the first fluid 218 from the first intermediate plenum chamber 206(a) to the outlet plenum chamber 204. In particular embodiments, wherein the second bypass valve 222 is present, the second bypass valve 222 will respond by increasing the flow rate of the first fluid 218 being extracted from the second intermediate plenum chamber 206(b) via the second exhaust port EP2 which will reduce or in some conditions eliminate the flow of the first fluid 218 to the first intermediate plenum chamber 206(a).

As the temperature of the second fluid 232 decreases, such as during cruise conditions, the first bypass valve 216 (and/or second bypass valve 222 when present) is actuated or adjusted or will passively adjust by transitioning between an open and a closed position as a result of a change in temperature or pressure to increase the flow of the first fluid 218 to the outlet plenum chamber 204 and/or to the first intermediate plenum chamber 206(a). This allows additional time for heat transfer to occur between the first fluid 218 and the second fluid 232 upstream from the outlet plenum chamber 204. In some operating conditions it is preferential to allow at least a minimal flow of the first fluid 218 from the first intermediate plenum chamber 206(a) to flow through to the outlet plenum chamber 204 to prevent plugging or clogging of the first fluid 218 between the first intermediate plenum chamber 206(a) and the outlet plenum chamber 204.

Figure 9:
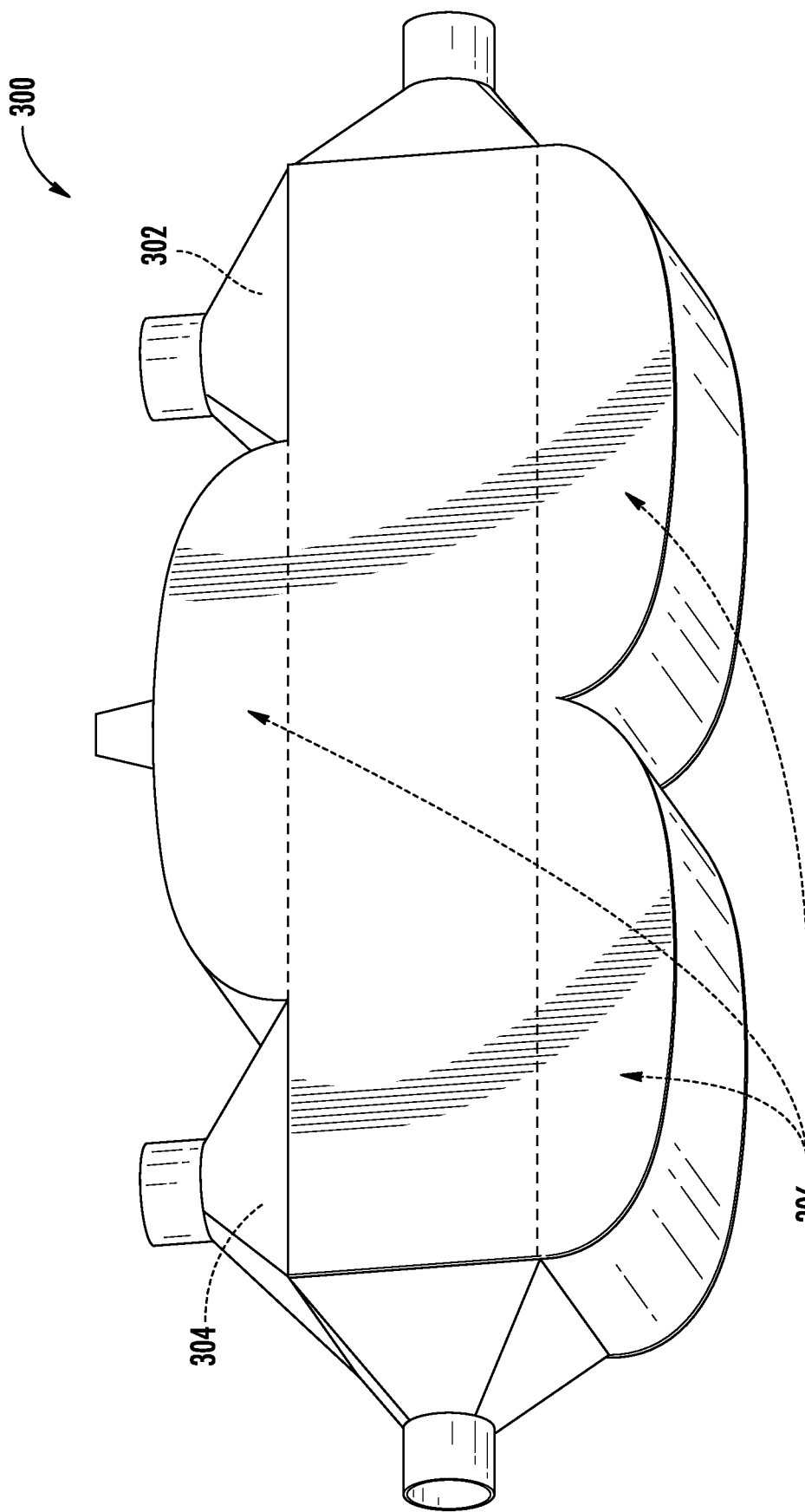
FIG. 9 is a perspective view of an exemplary heat exchanger according to exemplary embodiments of the present disclosure.
Figure 10:
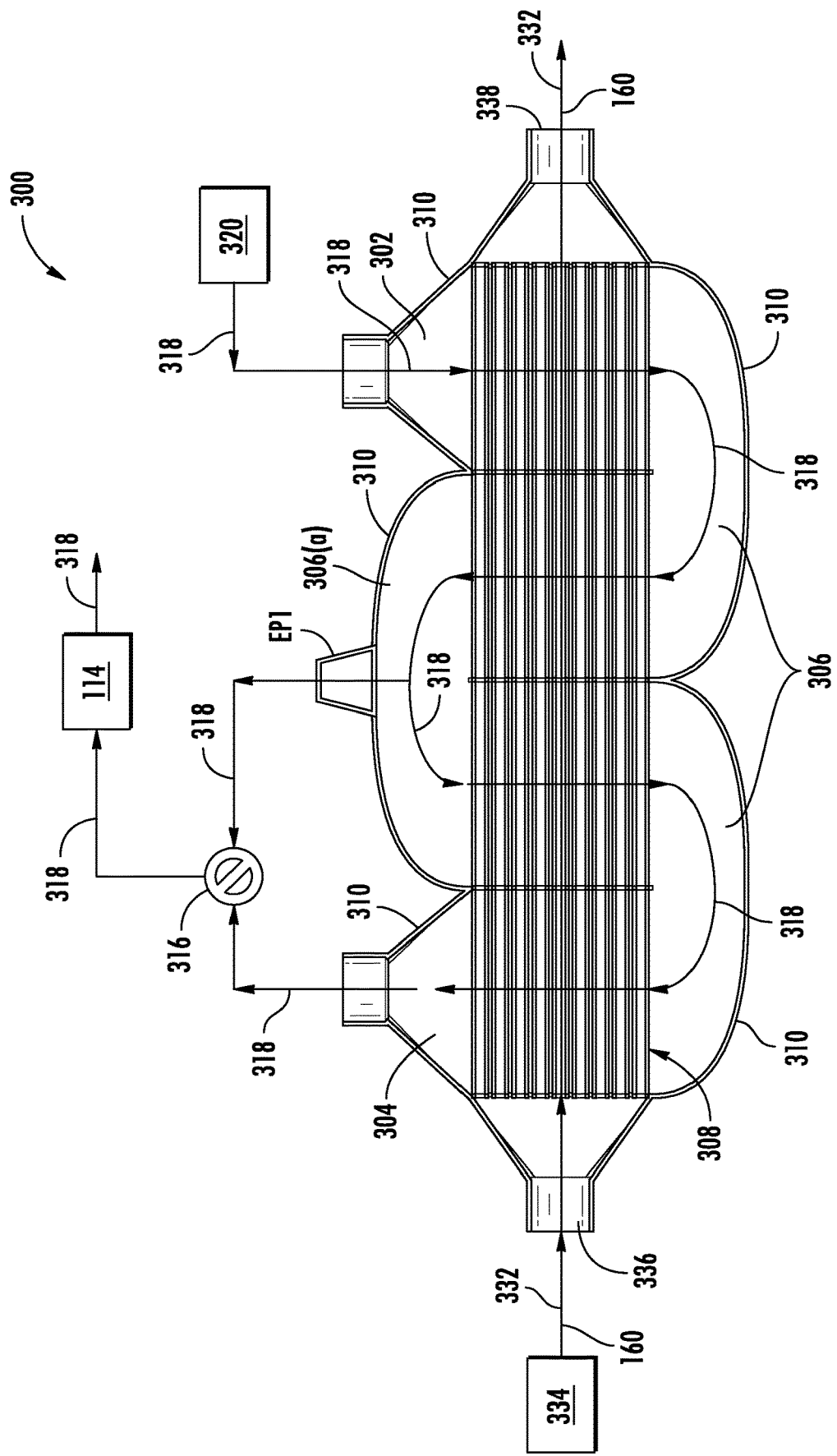
FIG. 10 is a schematic view of the exemplary heat exchanger shown in FIG. 9, according to exemplary embodiments of the present disclosure.
Figure 11:
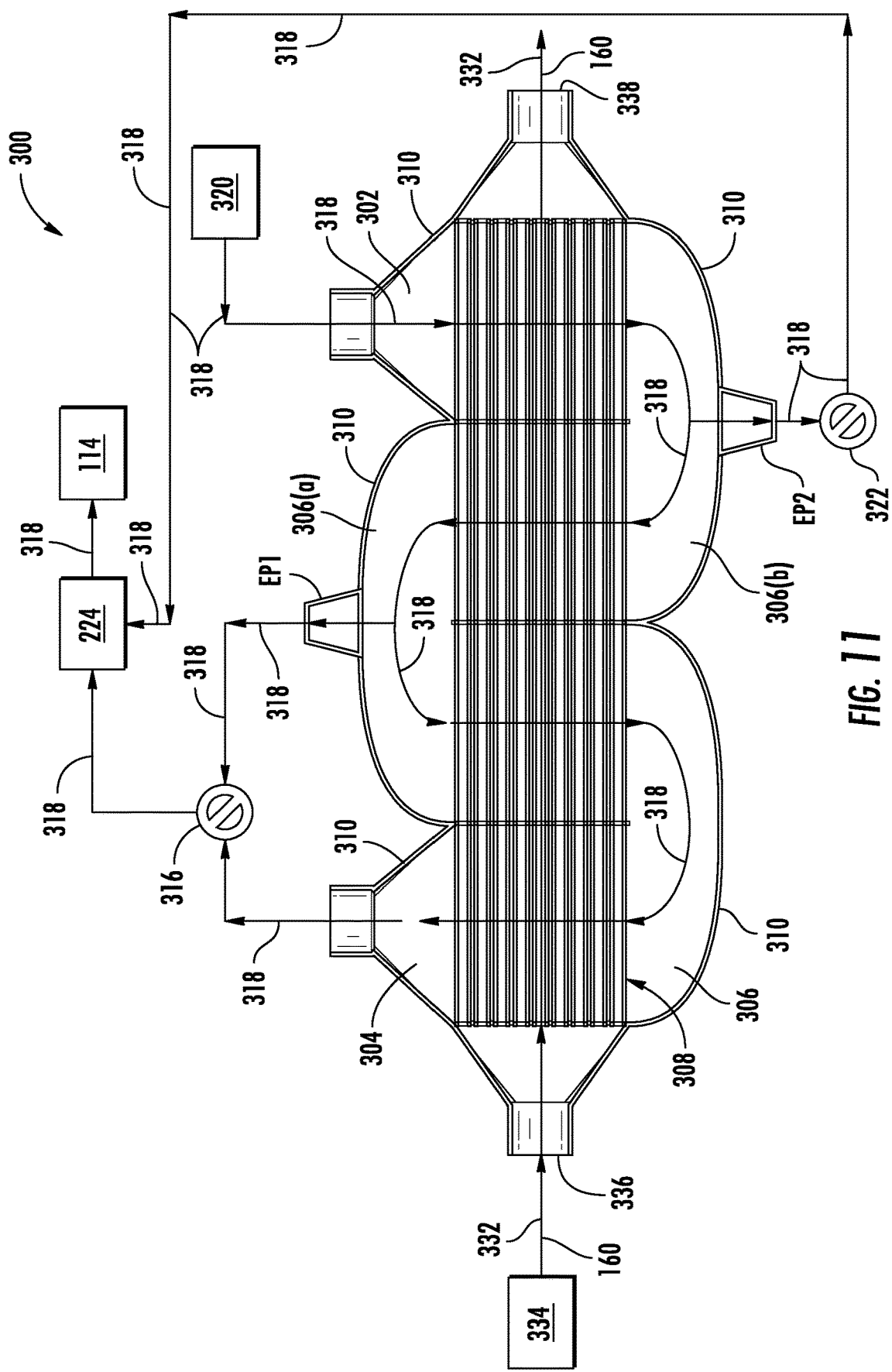
FIG. 11 is a schematic view of the exemplary heat exchanger shown in FIG. 9, according to exemplary embodiments of the present disclosure.

FIG. 9 is a perspective view of an alternate embodiment of exemplary heat exchanger 200 shown in FIGS. 3-7 and herein referred to as heat exchanger 300, as may be incorporated into the aircraft 10 shown in FIG. 1 and/or the gas turbine engine 100 shown in FIG. 2. FIG. 10 is a schematic view of the exemplary heat exchanger 300 according to embodiments of the present disclosure. FIG. 11 is a schematic view of the exemplary heat exchanger 300 according to embodiments of the present disclosure.

As shown in FIGS. 9, 10 and 11 collectively, the heat exchanger 300 includes an inlet plenum chamber 302, an outlet plenum chamber 304, a plurality of intermediate plenum chambers 306 disposed downstream from the inlet plenum chamber 302 and upstream from the outlet plenum chamber 304, and at least one tube bundle 308. It should be appreciated that although the heat exchanger 300 shown in FIG. 10 includes 3 intermediate plenum chambers 306, the heat exchanger 300 may include more than 3 or less than 3 intermediate plenum chambers 306 as required for a particular use or application.

In exemplary embodiments, as shown in FIG. 10, the plurality of intermediate plenum chambers 306 includes a first intermediate plenum chamber 306(a). In exemplary embodiments, as shown in FIG. 11, the plurality of intermediate plenum chambers 306 includes a second intermediate plenum chamber 306(b).

In exemplary embodiments, one or more of the inlet plenum chambers 302, the plurality of intermediate plenum chambers 306, and the outlet plenum chamber 304 is formed or at least partially formed by a shell or walls 310 that at least partially or fully surrounds the tube bundle 308. The tube bundle 308 extends between/physically separates the various plenum chambers 302, 304, 306 from each other.

In exemplary embodiments, as shown in FIGS. 10 and 11, the heat exchanger 300 includes a first bypass valve 316 fluidly coupled to the first intermediate plenum chamber 306(a) via a first extraction port or outlet EP1 of the first intermediate plenum chamber 306(a). The first bypass valve 316 is configured to control fluid flow rate between the first intermediate plenum chamber 306(a) and the outlet plenum chamber 304 of a first fluid 318 from a first fluid source 320.

In exemplary embodiments, as shown in FIGS. 10 and 11, the first bypass valve 316 is disposed outside of the first intermediate plenum chamber 306(a). In particular embodiments, the first bypass valve 316 is an actively controlled splitter valve. In certain embodiments, the first bypass valve 316 may be pneumatically or electrically actuated. In particular embodiments, the outlet plenum chamber 304 is fluidly coupled to the first bypass valve 316. In exemplary embodiments, the first bypass valve 316 is fluidly coupled to the combustion section 114 or other component or section of the gas turbine engine 100 shown in FIG. 2.

In particular embodiments, as shown in FIG. 11, the heat exchanger 300 may further include a second bypass valve 322 fluidly coupled to a second intermediate plenum chamber 306(b) of the plurality of intermediate plenum chambers 306 via a second extraction port or outlet EP2. In exemplary embodiments, the second intermediate plenum chamber 306(b) is disposed upstream from the first intermediate plenum chamber 306(a). In particular embodiments, as shown in FIG. 11, the first bypass valve 316 and the second bypass valve 322 are fluidly coupled to a mixing chamber 324 thus allowing for mixing of a first portion of the first fluid 318 flowing from the first intermediate plenum chamber 306(a) with a second portion of the first fluid 318 flowing from the second intermediate plenum chamber 306(b) upstream from the combustion section 114 or other component or section of the gas turbine engine 100 shown in FIG. 2.

The second bypass valve 322 is configured to control fluid flow rate of the first fluid 318 from the first fluid source 320 to the first intermediate plenum chamber 306(a). In an exemplary embodiment as shown in FIG. 11, the second bypass valve 322 is disposed outside of (downstream from the second exhaust port EP2) the second intermediate plenum chamber 306(b).

In particular embodiments, the second bypass valve 322 is an actively controlled splitter valve. In particular embodiments, the second bypass valve 322 is a pressure relief valve. In certain embodiments, the second bypass valve 322 may be pneumatically or electrically actuated. In exemplary embodiments, the second bypass valve 322 is fluidly coupled to the combustion section 114 or other component or section of the gas turbine engine 100 shown in FIG. 2.

Figure 12:
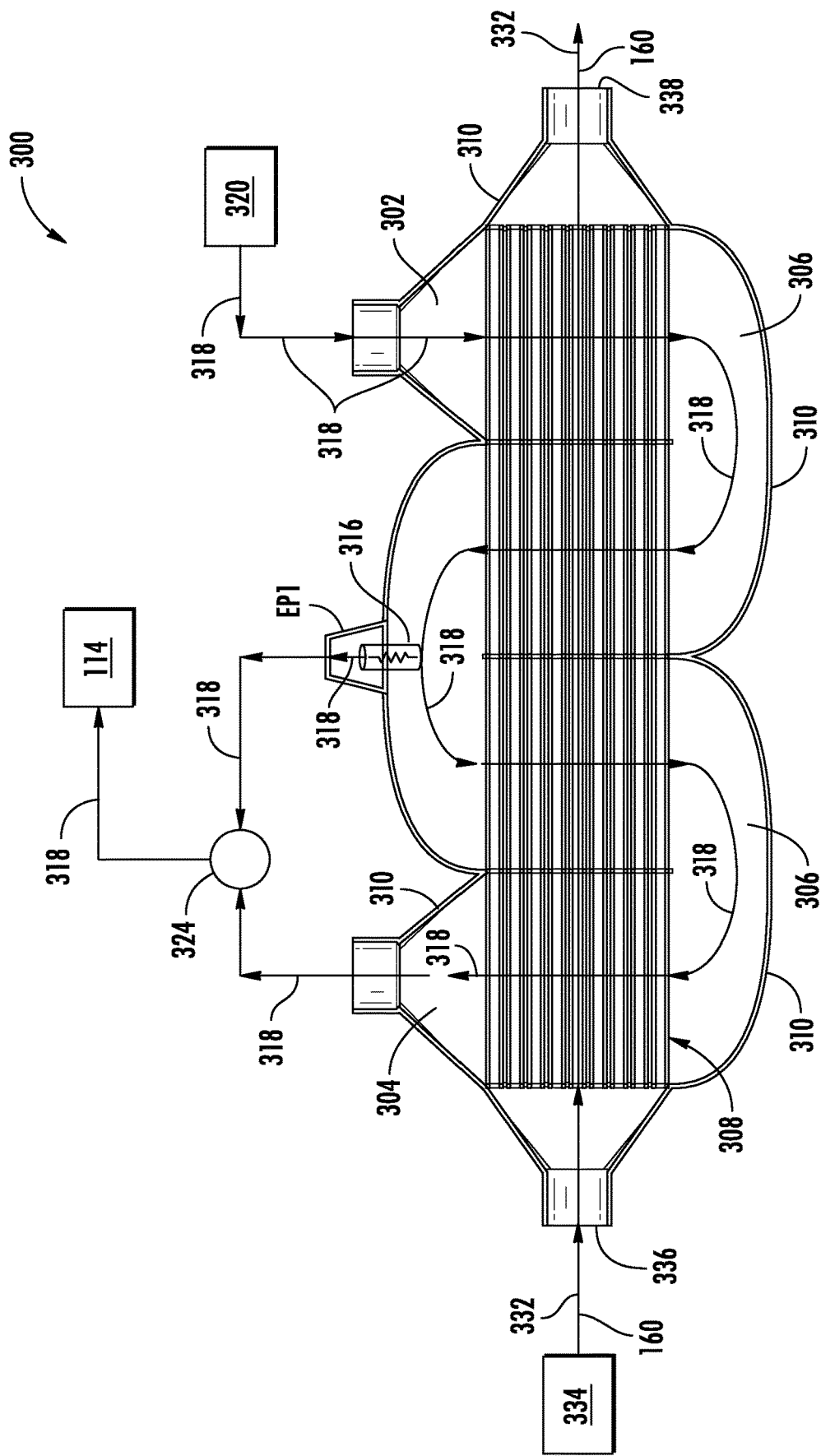
FIG. 12 is a schematic view of the exemplary heat exchanger shown in FIG. 9, according to exemplary embodiments of the present disclosure.
Figure 13:
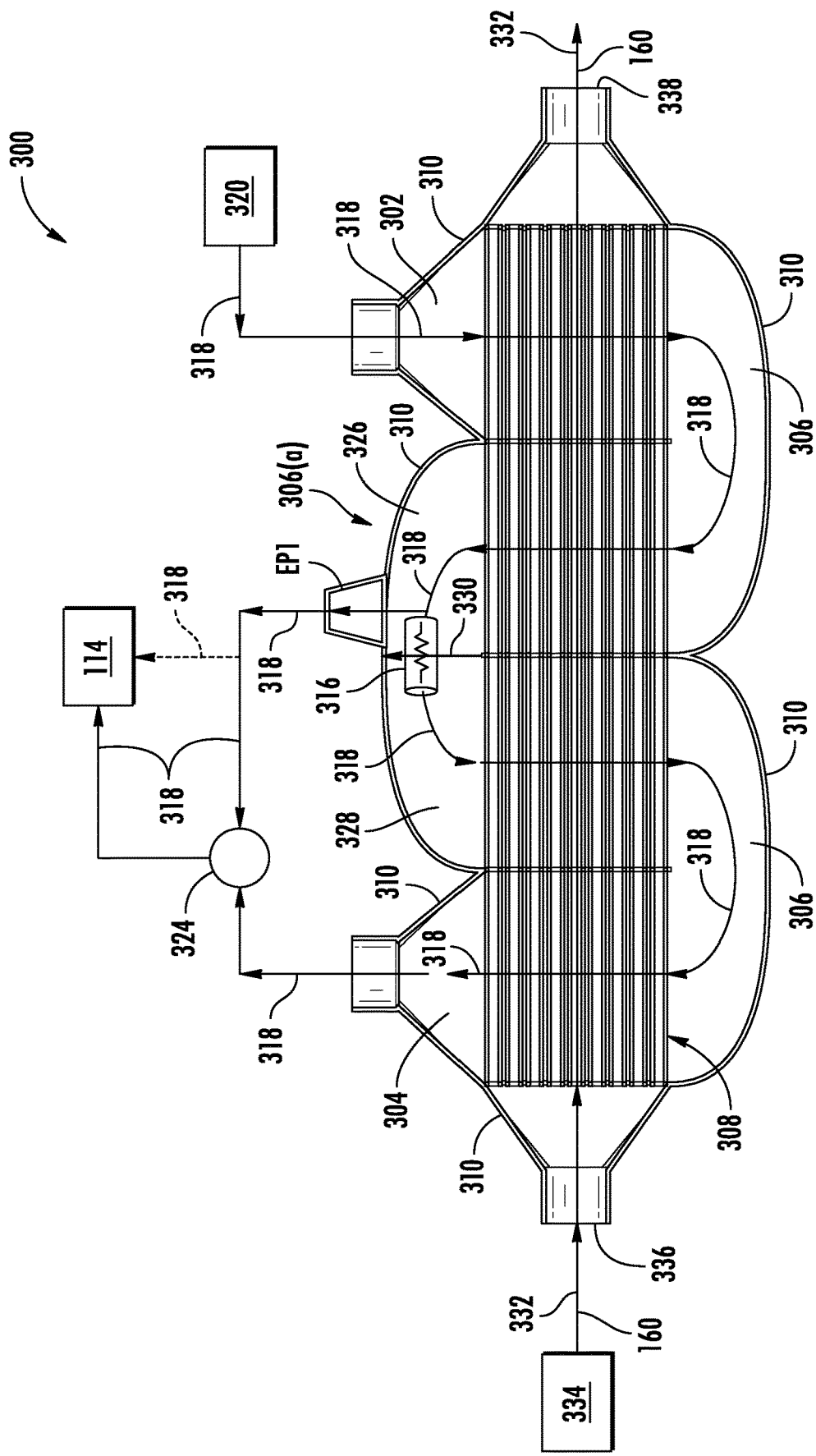
FIG. 13 is a schematic view of the exemplary heat exchanger shown in FIG. 9, according to exemplary embodiments of the present disclosure.

FIG. 12 is a schematic view of the exemplary heat exchanger 300 shown in FIG. 9, according to embodiments of the present disclosure. FIG. 13 is a schematic view of the exemplary heat exchanger 300 shown in FIG. 9, according to embodiments of the present disclosure.

In particular embodiments, as shown in FIGS. 12 and 13, the first bypass valve 316 is disposed or positioned at least partially or entirely within the first intermediate plenum chamber 306(a). In various embodiments, the first bypass valve 316 may be a thermostatic valve (e.g. wax based), pressure relief valve (e.g. spring poppet valve) or shape memory alloy that changes position with temperature.

In exemplary embodiments, as shown in FIG. 12, the first bypass valve 316 is configured to control fluid flow rate of the first fluid 318 from the first fluid source 320 between the first intermediate plenum chamber 306(a) and the outlet plenum chamber 304. In exemplary embodiments, the first bypass valve 316 is configured to control fluid flow rate of the first fluid 318 out of the first intermediate plenum chamber 306(a) via the first extraction port EP1 to the combustion section 114 or other component or section of the gas turbine engine 100 shown in FIG. 2. In certain embodiments, the first bypass valve 316 and the outlet plenum chamber 304 are fluidly coupled to the mixing chamber 324 thus allowing for mixing of a first portion of the first fluid 318 flowing from the first intermediate plenum chamber 306(a) with a second portion of the first fluid 318 flowing from the outlet plenum chamber 304 upstream from the combustion section 114 or other component or section of the gas turbine engine 100 shown in FIG. 2.

In particular embodiments, as shown in FIG. 13, the first intermediate plenum chamber 306(a) is sub-divided into a first chamber 326 and a second chamber 328 via a wall or support structure 330. The first bypass valve 316 is mounted or otherwise arranged to fluidly couple the first chamber 326 and the second chamber 328 and is configured to meter flow of the first fluid 318 from the first chamber 326 to the second chamber 328. The first chamber 326 may be fluidly coupled to mixing chamber 324 and/or to the combustion section 114 or other component or section of the gas turbine engine 100 shown in FIG. 2 via the first extraction port EP1. In particular embodiments, the first chamber 326 and the outlet plenum chamber 304 may be fluidly coupled to mixing chamber 324.

In operation, as shown in FIGS. 10, 11, 12 and 13 collectively, a second fluid 332 such as the hot-side fluid 160 (FIG. 2) flows from a second fluid source 334 and through the tube bundle 308 via a tube inlet 336 and a tube outlet 338. The first fluid 318 makes multiple successive passes across the tube bundle 308 as it flows, in serial flow order, from the inlet plenum chamber 302, through the plurality of intermediate plenum chambers 306, and through the outlet plenum chamber 304. In various embodiments, the second fluid source 334 may include one or more of the following shown in FIG. 2, the low-pressure compressor 110, the high-pressure compressor 112, the high-pressure turbine 116, the low-pressure turbine 118, and the jet exhaust section 120, for extracting waste heat from a respective airflow or fluid flow therefrom, such that the extracted waste heat may be utilized as the hot-side fluid 160 (or a cold-side fluid (CSF)) in the heat exchanger 300.

In particular embodiments, the first fluid 318 includes liquid hydrogen (LH2) from the fuel tank 148 of the fuel delivery assembly 150 as shown in FIG. 2, and the second fluid 332 is used to add heat to the liquid hydrogen (LH2) flowing through the tube bundle 308, thereby transitioning or assisting the transition of the liquid hydrogen LH2 to a gaseous hydrogen (GH2) for combustion in the combustion section 114. In other embodiments, the inlet plenum chamber 302 may be fluidly coupled to the fuel system 146, the main lubrication system 152, and/or the generator lubrication system 158.

Referring to FIGS. 10 and 11, as the first fluid 218 travels through the inlet plenum chamber 302 and the plurality of intermediate plenum chambers 306, the first bypass valve 316 is actuated or adjusted to control or meter the flow rate of the first fluid 318 flowing from the first intermediate plenum chamber 306(a) to the outlet plenum chamber 304 in response to temperature changes of the second fluid 332 which are the result of changes to operational conditions of the gas turbine engine 100 (FIG. 2).

Referring now to FIG. 11, in particular embodiments wherein the heat exchanger 300 includes the second bypass valve 322, the second bypass valve 322 may be actuated or adjusted via a controller to control or meter the flow rate of the first fluid 318 flowing from the second intermediate plenum chamber 306(b) the first intermediate plenum chamber 306(a) in response to the temperature changes of the second fluid 332 which are the result of changes to operational conditions of the gas turbine engine 100 (FIG. 2).

In particular embodiments, referring to FIG. 12, as the first fluid 318 travels through the inlet plenum chamber 302 and the plurality of intermediate plenum chambers 306, the first bypass valve 316 will passively transition between a fully open and fully closed position based on temperature and/or pressure of the first fluid 318 to meter the flow rate of the first fluid 318 flowing from the first intermediate plenum chamber 306(a) to the outlet plenum chamber 304. The change in temperature and/or pressure in the first fluid 318 is in response to temperature change of the second fluid 332 which is the result of changes to operational conditions of the gas turbine engine 100 (FIG. 2).

In particular embodiments, referring to FIG. 13 wherein the first intermediate plenum chamber 306(a) is sub-divided in the first chamber 326 and the second chamber 328, the bypass valve 316 meters flow from the first chamber 326 to the second chamber 328 in response to temperature changes of the first fluid 318 which is caused by temperature changes of the second fluid 332 which are the result of changes to operational conditions of the gas turbine engine 100 (FIG. 2).

As one example of a change in the temperature of the second fluid 332, during take-off the temperature of the second fluid 332 may be much higher than required to sufficiently heat the first fluid 318 to a desired temperature. As such, the first bypass valve 316 will actuate or adjust via a passive response, thereby increasing the flow rate of the first fluid 318 being extracted from the first intermediate plenum chamber 306(a) via the first exhaust port EP1, which will reduce or may eliminate the flow of the first fluid 318 from the first intermediate plenum chamber 306(a) to the outlet plenum chamber 304. In particular embodiments, wherein the second bypass valve 322 is present, the second bypass valve 322 will respond by increasing the flow rate of the first fluid 318 being extracted from the second intermediate plenum chamber 306(b) via the second exhaust port EP2 which will reduce or in some conditions eliminate the flow of the first fluid 318 to the first intermediate plenum chamber 306(a).

As the temperature of the second fluid 332 decreases, such as during cruise conditions, the first bypass valve 316 (and/or second bypass valve 322 when present) is actuated or adjusted or will passively adjust to increase the flow of the first fluid 318 to the outlet plenum chamber 304 and/or to the first intermediate plenum chamber 306(a). This allows additional time for heat transfer to occur between the first fluid 318 and the second fluid 332 upstream from the outlet plenum chamber 304. In some operating conditions it is preferential to allow at least a minimal flow of the first fluid 318 from the first intermediate plenum chamber 306(a) to flow through to the outlet plenum chamber 304 to prevent plugging or clogging of the first fluid 318 between the first intermediate plenum chamber 306(a) and the outlet plenum chamber 304.

Further aspects are provided by the subject matter of the following clauses:

A heat exchanger, comprising: an inlet plenum chamber; an outlet plenum chamber fluidly coupled to the inlet fluid chamber; a plurality of intermediate plenum chambers disposed downstream from the inlet plenum chamber and upstream from the outlet plenum chamber, the plurality of intermediate plenum chambers including a first intermediate plenum chamber; at least one tube bundle; and a first bypass valve fluidly coupled to the first intermediate plenum chamber, wherein the first bypass valve is configured to control fluid flow rate from the first intermediate plenum chamber to the outlet plenum chamber.

The heat exchanger of the preceding clause, wherein the first bypass valve is disposed outside of and downstream from the first intermediate plenum chamber The heat exchanger of any preceding clause, wherein the first bypass valve is an actively controlled splitter valve.

The heat exchanger of any preceding clause, wherein the first bypass valve is a thermostatic valve, pressure relief valve or shape memory alloy valve.

The heat exchanger of any preceding clause, wherein the first intermediate plenum chamber and the outlet plenum chamber are fluidly coupled to a mixing chamber.

The heat exchanger of any preceding clause, wherein the first intermediate plenum chamber is sub-divided into a first chamber and a second chamber, wherein the first bypass valve is configured to meter flow from the first chamber to the second chamber.

The heat exchanger of any preceding clause, further comprising a second bypass valve, wherein the plurality of intermediate plenum chambers includes a second intermediate plenum chamber, and wherein the second intermediate plenum chamber is fluidly coupled to the second bypass valve.

The heat exchanger of any preceding clause, wherein the second bypass valve controls fluid flow between the second intermediate plenum chamber and the first intermediate plenum chamber.

The heat exchanger of any preceding clause, wherein the at least one tube bundle includes a plurality of tube bundles, wherein the plurality of tube bundles includes an inlet tube bundle, $N_+$ intermediate tube bundles, and an outlet tube bundle, wherein the $N_+$ intermediate tube bundles provide for fluid communication from the inlet plenum chamber, to each intermediate plenum chamber, and to the outlet plenum chamber.

The heat exchanger of any preceding clause, wherein the heat exchanger further includes a shell that at least partially surrounds the at least one tube bundle, wherein the shell at least partially defines the inlet plenum chamber, the plurality of intermediate plenum chambers, and the outlet plenum chamber.

A turbine engine, comprising: a heat exchanger, the heat exchanger comprising: an inlet plenum chamber; an outlet plenum chamber; a plurality of intermediate plenum chambers disposed downstream from the inlet plenum chamber and upstream from the outlet plenum chamber, the plurality of intermediate plenum chambers including a first intermediate plenum chamber; at least one tube bundle; and a first bypass valve fluidly coupled to the first intermediate plenum chamber, wherein the first bypass valve is configured to control fluid flow rate from the first intermediate plenum chamber to the outlet plenum chamber.

The turbine engine of the preceding clause, wherein the first bypass valve is disposed outside of the first intermediate plenum chamber.

The turbine engine of any preceding clause, wherein the first bypass valve is one of an actively controlled splitter valve, a thermostatic valve, pressure relief valve or shape memory alloy valve.

The turbine engine of any preceding clause, wherein the first intermediate plenum chamber and the outlet plenum chamber are fluidly coupled to a mixing chamber.

The turbine engine of any preceding clause, wherein the first intermediate plenum chamber is sub-divided into a first chamber and a second chamber, wherein the first bypass valve meters flow from the first chamber to the second chamber.

The turbine engine of any preceding clause, wherein the first intermediate plenum chamber is sub-divided into a first chamber and a second chamber, wherein the first bypass valve meters flow from the first chamber to the second chamber, and wherein the first chamber is fluidly coupled to a first system of the turbine engine and the outlet plenum chamber is fluid coupled to a second system of the turbine engine.

The turbine engine of any preceding clause, wherein the plurality of intermediate plenum chambers includes a second intermediate plenum chamber, and wherein the second intermediate plenum chamber is fluidly coupled to the first bypass valve.

The turbine engine of any preceding clause, wherein the plurality of intermediate plenum chambers includes a second intermediate plenum chamber, wherein the heat exchanger further comprises a second bypass valve, wherein the second bypass valve control fluid flow between the second intermediate plenum chamber and the first intermediate plenum chamber.

The turbine engine of any preceding clause, wherein the at least one tube bundle includes a plurality of tube bundles, wherein the plurality of tube bundles includes an inlet tube bundle, $N_+$ intermediate tube bundles, and an outlet tube bundle, wherein the $N_+$ intermediate tube bundles provide for fluid communication from the inlet plenum chamber, to each intermediate plenum chamber, and to the outlet plenum chamber.

The turbine engine, wherein the heat exchanger further includes a shell that at least partially surrounds the at least one tube bundle, wherein the shell at least partially defines the inlet plenum chamber, the plurality of intermediate plenum chambers and the outlet chamber.

The turbine engine of any preceding clause, further comprising a tube side fluid source and a shell side fluid source, wherein the at least one tube bundle includes a single tube bundle that extends within the shell, wherein the single tube bundle is fluidly coupled to the tube side fluid source, and wherein the inlet plenum chamber is fluidly coupled to the shell side fluid source.

This written description uses examples to disclose the present disclosure, including the best mode, and to also enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A heat exchanger, comprising:
an inlet plenum chamber;
an outlet plenum chamber fluidly coupled to the inlet chamber;
a plurality of intermediate plenum chambers disposed downstream from the inlet plenum chamber and upstream from the outlet plenum chamber, the plurality of intermediate plenum chambers including a first intermediate plenum chamber;
at least one tube bundle; and
a first bypass valve fluidly coupled to the first intermediate plenum chamber, wherein the first bypass valve is configured to control fluid flow rate from the first intermediate plenum chamber to the outlet plenum chamber,
wherein the at least one tube bundle includes a plurality of tube bundles, wherein the plurality of tube bundles includes an inlet tube bundle, $N_+$ intermediate tube bundles, and an outlet tube bundle, wherein the $N_+$ intermediate tube bundles provide for fluid communication from the inlet plenum chamber, to each intermediate plenum chamber, and to the outlet plenum chamber.

2. The heat exchanger as in claim 1, wherein the first bypass valve is disposed outside of and downstream from the first intermediate plenum chamber.

3. The heat exchanger as in claim 1, wherein the first bypass valve is an actively controlled splitter valve.

4. The heat exchanger as in claim 1, wherein the first bypass valve is a thermostatic valve, pressure relief valve or shape memory alloy valve.

5. The heat exchanger as in claim 1, wherein the first intermediate plenum chamber and the outlet plenum chamber are fluidly coupled to a mixing chamber.

6. The heat exchanger as in claim 1, wherein the first intermediate plenum chamber is sub-divided into a first chamber and a second chamber, wherein the first bypass valve is configured to meter flow from the first chamber to the second chamber.

7. The heat exchanger as in claim 1, further comprising a second bypass valve, wherein the plurality of intermediate plenum chambers includes a second intermediate plenum chamber, and wherein the second intermediate plenum chamber is fluidly coupled to the second bypass valve.

8. The heat exchanger as in claim 7, wherein the second bypass valve controls fluid flow between the second intermediate plenum chamber and the first intermediate plenum chamber.

9. A turbine engine, comprising:
a heat exchanger, the heat exchanger comprising:
an inlet plenum chamber;
an outlet plenum chamber fluidly coupled to the inlet plenum chamber;
a plurality of intermediate plenum chambers disposed downstream from the inlet plenum chamber and upstream from the outlet plenum chamber, the plurality of intermediate plenum chambers including a first intermediate plenum chamber;
at least one tube bundle; and
a first bypass valve fluidly coupled to the first intermediate plenum chamber, wherein the first bypass valve is configured to control fluid flow rate from the first intermediate plenum chamber to the outlet plenum chamber, wherein the first intermediate plenum chamber and the outlet plenum chamber are fluidly coupled to a mixing chamber.

10. The turbine engine as in claim 9, wherein the first bypass valve is disposed outside of and downstream from the first intermediate plenum chamber.

11. The turbine engine as in claim 9, wherein the first bypass valve is one of an actively controlled splitter valve, a thermostatic valve, pressure relief valve or shape memory alloy valve.

12. The turbine engine as in claim 9, wherein the first intermediate plenum chamber is sub-divided into a first chamber and a second chamber, wherein the first bypass valve meters flow from the first chamber to the second chamber, and wherein the first chamber is fluidly coupled to a first system of the turbine engine and the outlet plenum chamber is fluid coupled to a second system of the turbine engine.

13. The turbine engine as in claim 9, wherein the plurality of intermediate plenum chambers includes a second intermediate plenum chamber, and wherein the second intermediate plenum chamber is fluidly coupled to the first bypass valve.

14. The turbine engine as in claim 9, wherein the plurality of intermediate plenum chambers includes a second intermediate plenum chamber, wherein the heat exchanger further comprises a second bypass valve, wherein the second bypass valve controls fluid flow between the second intermediate plenum chamber and the first intermediate plenum chamber.

15. The turbine engine as in claim 9, wherein the at least one tube bundle includes a plurality of tube bundles, wherein the plurality of tube bundles includes an inlet tube bundle, $N_+$ intermediate tube bundles, and an outlet tube bundle, wherein the $N_+$ intermediate tube bundles provide for fluid communication from the inlet plenum chamber, to each intermediate plenum chamber, and to the outlet plenum chamber.

16. The turbine engine as in claim 9, wherein the heat exchanger further includes a shell that at least partially surrounds the at least one tube bundle, wherein the shell at least partially defines the inlet plenum chamber, the plurality of intermediate plenum chambers and the outlet plenum chamber.

17. The turbine engine as in claim 16, further comprising a tube side fluid source and a shell side fluid source, wherein the at least one tube bundle includes a single tube bundle that extends within the shell, wherein the single tube bundle is fluidly coupled to the tube side fluid source, and wherein the inlet plenum chamber is fluidly coupled to the shell side fluid source.

18. A heat exchanger, comprising:
an inlet plenum chamber;
an outlet plenum chamber fluidly coupled to the inlet chamber;
a plurality of intermediate plenum chambers disposed downstream from the inlet plenum chamber and upstream from the outlet plenum chamber, the plurality of intermediate plenum chambers including a first intermediate plenum chamber;

at least one tube bundle; and a first bypass valve fluidly coupled to the first intermediate plenum chamber, wherein the first bypass valve is configured to control fluid flow rate from the first intermediate plenum chamber to the outlet plenum chamber, wherein the heat exchanger further includes a shell that at least partially surrounds the at least one tube bundle, wherein the shell at least partially defines the inlet plenum chamber, the plurality of intermediate plenum chambers, and the outlet plenum chamber.

19. The heat exchanger as in claim 18, wherein the at least one tube bundle includes a single tube bundle that extends within the shell, wherein the single tube bundle is fluidly coupled to the tube side fluid source, and wherein the inlet plenum chamber is fluidly coupled to the shell side fluid source.

20. The heat exchanger as in claim 18, wherein the first bypass valve is disposed outside of and downstream from the first intermediate plenum chamber.

21. The heat exchanger as in claim 18, wherein the first bypass valve is an actively controlled splitter valve.

22. The heat exchanger as in claim 18, wherein the first bypass valve is a thermostatic valve, pressure relief valve or shape memory alloy valve.

23. The heat exchanger as in claim 18, wherein the first intermediate plenum chamber and the outlet plenum chamber are fluidly coupled to a mixing chamber.

24. The heat exchanger as in claim 18, wherein the first intermediate plenum chamber is sub-divided into a first chamber and a second chamber, wherein the first bypass valve is configured to meter flow from the first chamber to the second chamber.

25. The heat exchanger as in claim 18, further comprising a second bypass valve, wherein the plurality of intermediate plenum chambers includes a second intermediate plenum chamber, and wherein the second intermediate plenum chamber is fluidly coupled to the second bypass valve.

26. The heat exchanger as in claim 25, wherein the second bypass valve controls fluid flow between the second intermediate plenum chamber and the first intermediate plenum chamber.

* * * * *